United States Patent [19]

Kanai et al.

[11] Patent Number: 5,078,243
[45] Date of Patent: Jan. 7, 1992

[54] ONE-WAY CLUTCH

[75] Inventors: Kenichi Kanai, Chigasaki; Hidetaka Nakano, Fujisawa, both of Japan

[73] Assignee: NSK-Warner K.K., Tokyo, Japan

[21] Appl. No.: 544,238

[22] Filed: Jun. 26, 1990

[30] Foreign Application Priority Data

Jun. 30, 1989 [JP] Japan ................... 1-167030

[51] Int. Cl.⁵ .............................................. F16D 41/06
[52] U.S. Cl. ........................................ 192/45; 384/560
[58] Field of Search ................ 192/45, 45.1; 384/504, 384/505, 510, 512, 523, 537, 560, 606

[56] References Cited

U.S. PATENT DOCUMENTS

| 3,095,954 | 7/1963 | Ferris ................................... 192/45 |
| 4,783,182 | 11/1988 | Caron et al. ......................... 384/504 |
| 4,875,564 | 10/1989 | Leitz et al. ......................... 192/45.1 |

FOREIGN PATENT DOCUMENTS

| 3241053 | 5/1984 | Fed. Rep. of Germany ........ 192/45 |
| 3614558 | 11/1987 | Fed. Rep. of Germany ...... 384/512 |
| 1128009 | 12/1984 | U.S.S.R. ............................. 384/512 |
| 2199090 | 6/1988 | United Kingdom ............... 384/512 |

Primary Examiner—Rodney H. Bonck
Attorney, Agent, or Firm—Shapiro and Shapiro

[57] ABSTRACT

A one-way clutch of the unitary bearing type comprises a bearing portion in which one of an inner race and an outer race is axially extended relative to the other of the inner race and the outer race, and a one-way clutch portion fitted to the extended portion and using the extended portion in common as its own inner race or outer race. The one-way clutch portion includes a plurality of wedge elements and a cage for retaining the wedge elements. A first engagement member protruding from a portion of the cage is engaged with a first receiving portion provided in the inner race or the outer race of the one-way clutch portion, and a second engagement member protruding from the cage is engaged with a second receiving portion provided in the inner race or the outer race of the bearing portion.

8 Claims, 7 Drawing Sheets

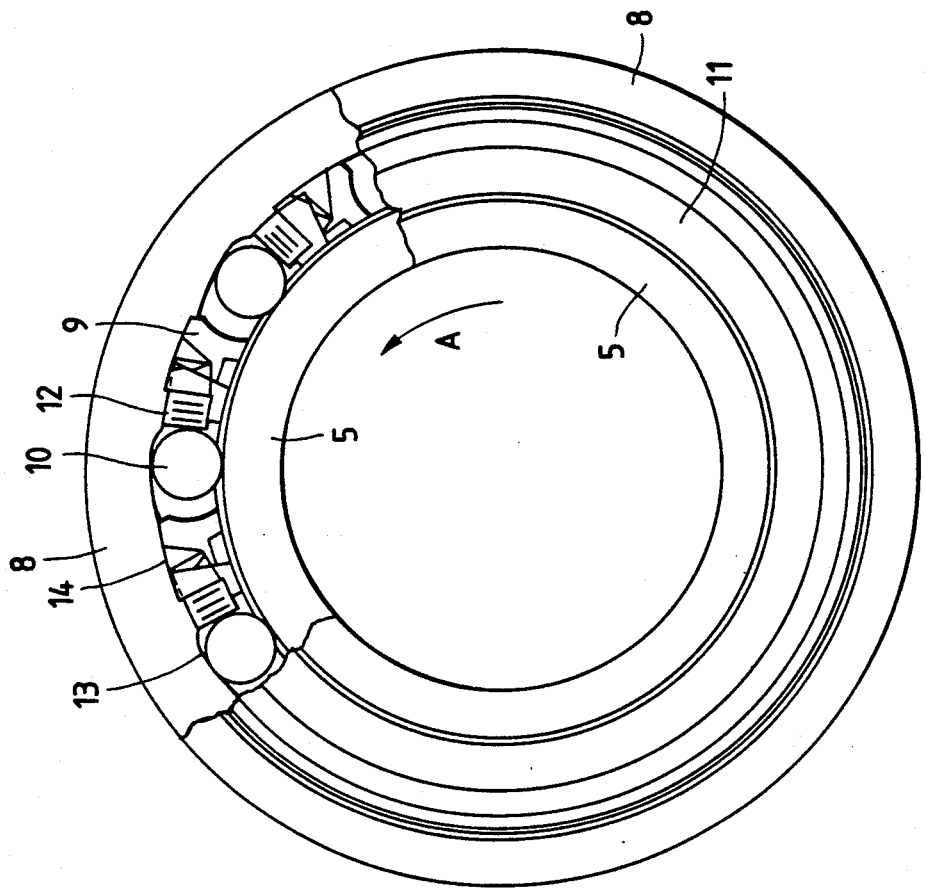
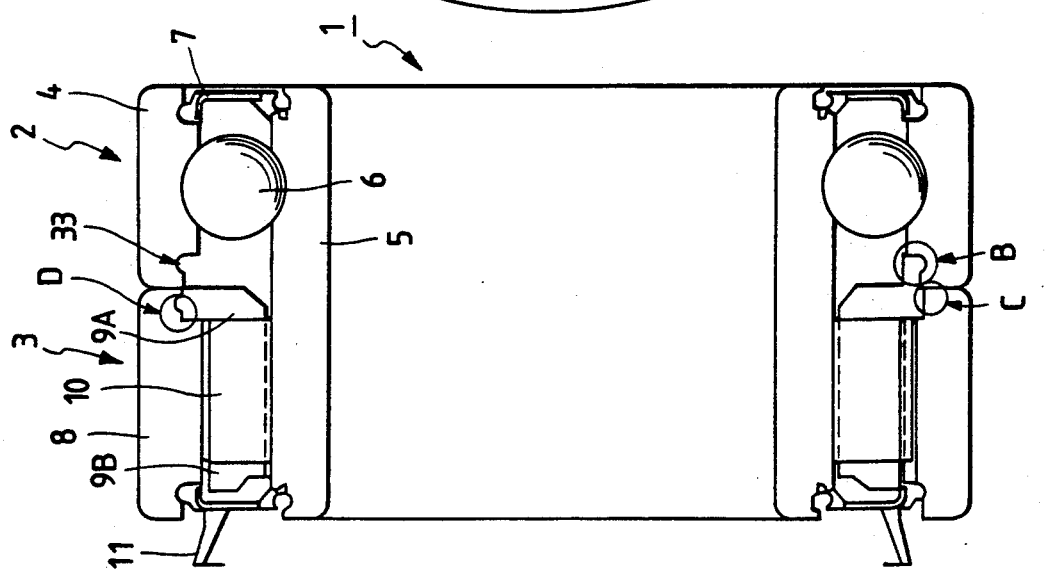

PORTION E SEEN FROM F

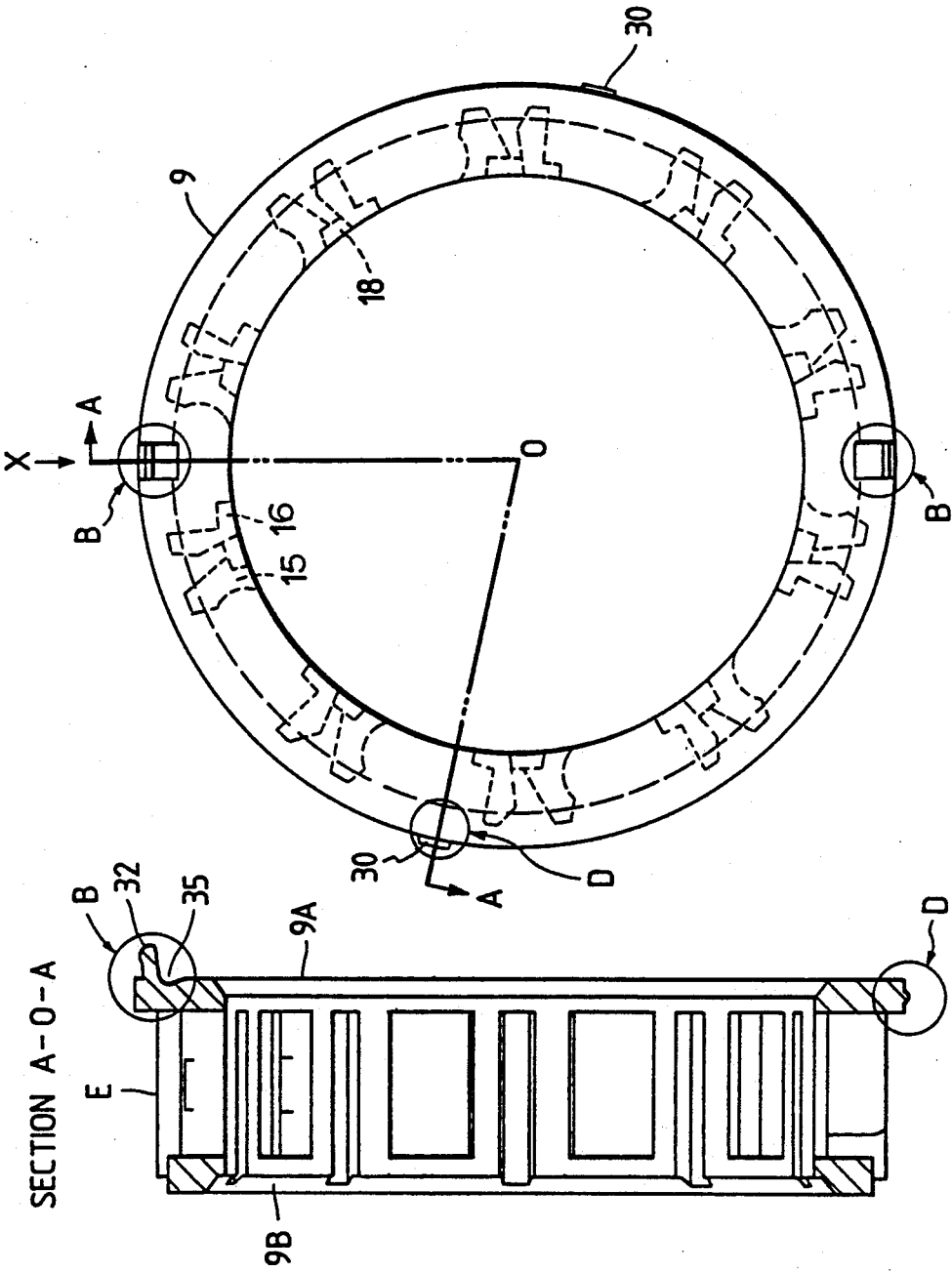

PORTION B

PORTION B
SEEN FROM X

PORTION D

SECTION A-O-A

ONE-WAY CLUTCH

BACKGROUND OF THE INVENTION

1. Field of the Invention

This invention relates to a one-way clutch (hereinafter sometimes referred to as OWC) of the unitary bearing type which is improved in assembling performance.

2. Related Background Art

A one-way clutch is a mechanical arrangement in which torque transmitting elements are interposed between an inner race and a concentric outer race and which functions to transmit torque between the races in only one rotational direction. The one-way clutch is commonly used as a separate unit, but is also often combined with a bearing which supports a load. For the latter purpose, a one-way clutch of the unitary bearing type is sometimes used. In this type of clutch, a bearing and a one-way clutch are made integral with each other for the purposes of making the mechanism compact and reducing the number of parts.

The one-way clutch of the unitary bearing type necessitates careful handling procedures to prevent disassembly of components, as during the subassembly of the one-way clutch portion, the fitting of the one-way clutch portion to the bearing portion, and the fitting of the assembly to a rotary shaft.

Recently, automatic assembling work by robots or the like has been widely adopted by industry. However, one-way clutches of the integral bearing type of the prior art are not compatible with such automatic assembly techniques, because of the need for careful handling as discussed above.

SUMMARY OF THE INVENTION

The present invention has been made in view of the above-noted circumstances and is intended to provide a one-way clutch of the unitary bearing type which is easy to assemble and easy to handle when it is actually mounted.

The one-way clutch of the unitary bearing type according to the present invention is constructed as an assembly of a bearing portion having one of an inner race and an outer race extended axially relative to the other of the inner race and the outer race, and a one-way clutch portion fitted to said extended portion and using said extended portion also as its inner race or the outer race. The one-way clutch portion includes a plurality of wedge elements and a cage for retaining said wedge elements, and is characterized in that a first engagement portion provided on a portion of said cage is engaged with a first receiving portion provided in the outer race or the inner race of the one-way clutch portion, and a second engagement portion protruding from said cage is engaged with a second receiving portion provided in the outer race or the inner race of said bearing portion.

In the present invention constructed as described above, when the assemblage of the one-way clutch portion is completed, the first engagement portion provided on the cage fits to the receiving portion in the inner race or the outer race of the one-way clutch, whereby the separation of the cage from the inner race or the outer race is prevented. Further, when the assembling of the one-way clutch portion and the bearing portion is completed, the second engagement portion provided on the cage of the one-way clutch portion fits to the second receiving portion provided in the inner race or the outer race of the bearing, whereby the separation of the bearing portion from the one-way clutch portion is prevented. Accordingly, there is no possibility of components becoming disassembled during the assembling of the one-way clutch portion and the bearing portion, or during the mounting of the assembly.

BRIEF DESCRIPTION OF THE DRAWINGS

FIGS. 1A and 1B are assembly views of a one-way clutch of the unitary bearing type according to the present invention.

FIGS. 2A and 2C are left and right side views of a cage.

FIG. 2B is a partly broken-away front view of the cage.

DESCRIPTION OF THE PREFERRED EMBODIMENTS

Figure 2A:
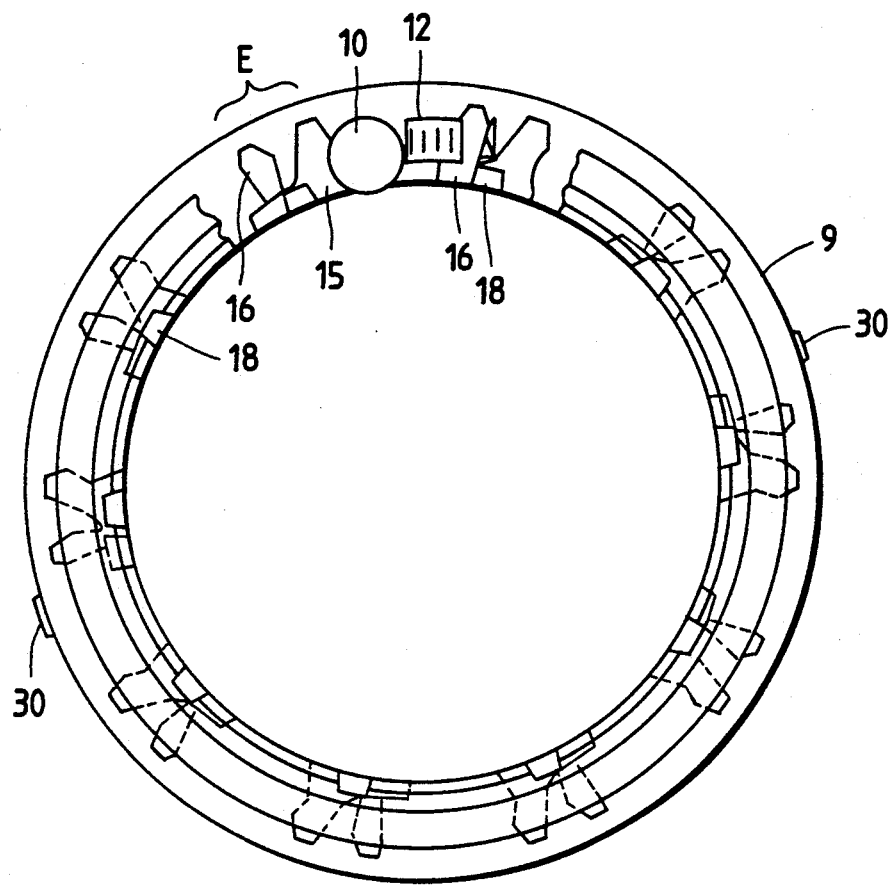
Figure 2D:
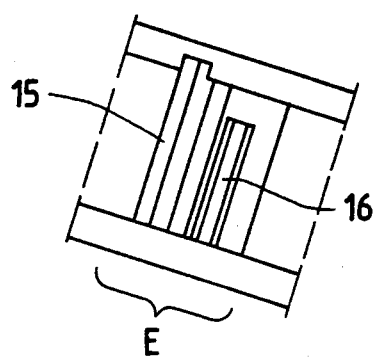
FIGS. 2D, 2E, 2F and 2G are fragmentary enlarged views of the cage.
Figure 2E:
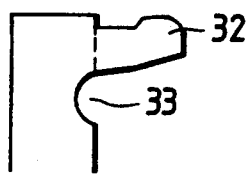
Figure 2F:
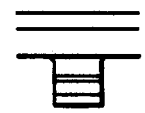

FIGS. 1A and 1B show a first embodiment of the present invention.

The illustrative one-way clutch 1 of the unitary bearing type is an assembly of a bearing portion 2 and a one-way clutch portion 3. The bearing portion 2 is comprised of an outer race 4, an inner race 5, rolling members 6 such as balls or rollers, an oil seal 7, etc. The inner race 5 has a portion which is axially extended beyond the outer race 4 (to the left in FIG. 1A), and said extended portion is used also as the inner race of the one-way clutch. The one-way clutch portion also includes an outer race 8, and a retainer or cage 9 integrally molded of flexible resin or the like. The reference numeral 10 designates cylindrical rollers as wedge elements retained by the cage 9. The reference numerals 7 and 11 denote oil seals for sealing the bearing portion and the one-way clutch portion. FIG. 1B is a side view of the one-way clutch of the unitary bearing type of FIG. 1A as it is seen from the left thereof, and is partly broken away in the axially central portion of the one-way clutch portion.

Figure 3C:
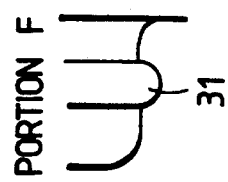
FIG. 3C is a fragmentary enlarged view of the outer race.
Figure 3B:
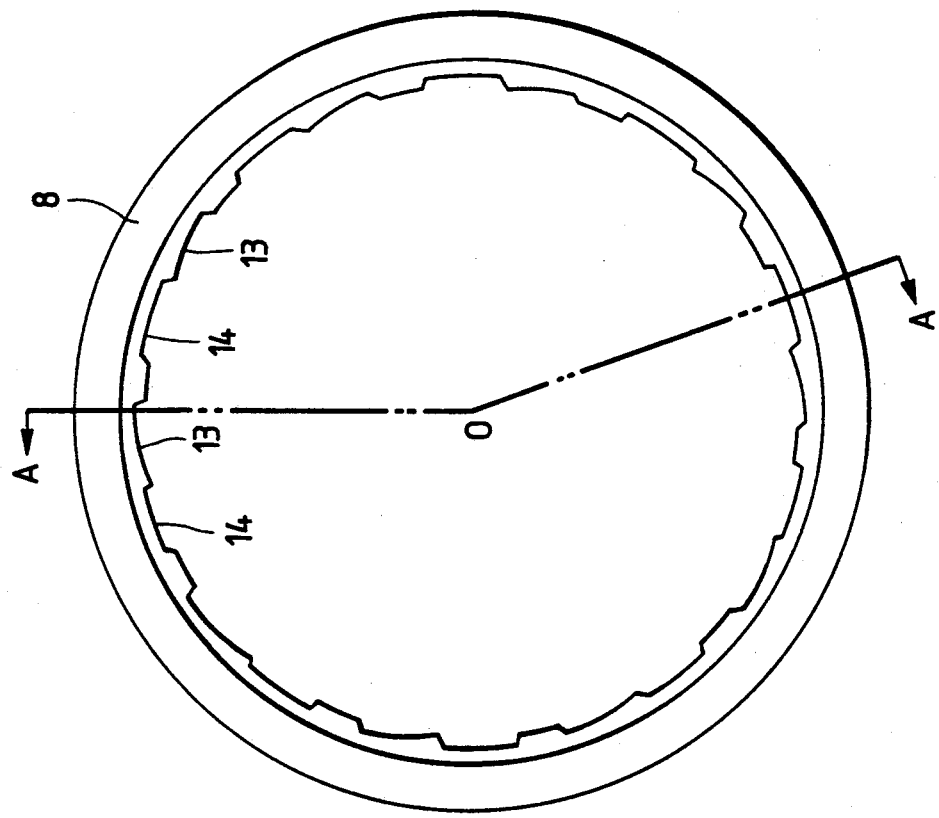
FIG. 3B is a left side view of the outer race.

Referring additionally to FIG. 3B, cam surfaces 13 are provided on the outer race 8 of the OWC at ten locations at equal intervals on the inner periphery thereof. The cam surfaces 13 are formed so that the rollers 10 may bite into the inner and outer races due to the wedge action provided by frictional force when the inner race 5 rotates relative to the outer race 8 in the direction of arrow A in FIG. 1B. The outer race also has receiving portions 14 numbering the same as the cam surfaces 13 provided on the outer race, and to which the cage fits in a manner to be explained shortly. As shown in FIG. 4, accordion springs 12 of equal number to the rollers are mounted on the cage 9 and impart a biasing force to the rollers 10.

Although in FIG. 1 the cam portions are provided on the outer race side, a so-called inner race cam roller clutch in which the cam portion is provided on the inner race side may also be adopted. In such case, however, the cam portion is worked on the outer periphery of the axially extended portion of the inner race of the bearing and this may not be preferable from the standpoint of ease of manufacture and cost. Further, the construction shown in FIG. 1 is such that the inner race side of the bearing is extended and the inner race of the OWC and the inner race of the bearing are used in common. Of course, the outer race of the bearing may be extended instead to provide a form in which the OWC is incorporated between the outer race and the main shaft of the bearing in such a manner that the outer race is used in common.

Figure 4B:
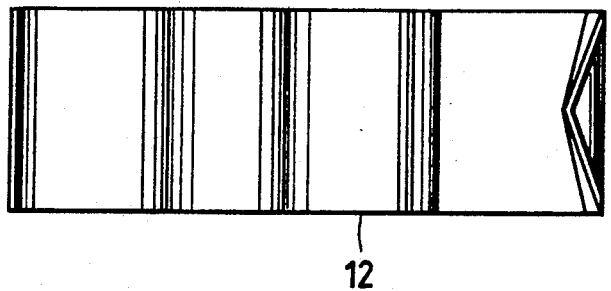
FIGS. 4A, 4B and 4C show an accordion spring.
Figure 4A:
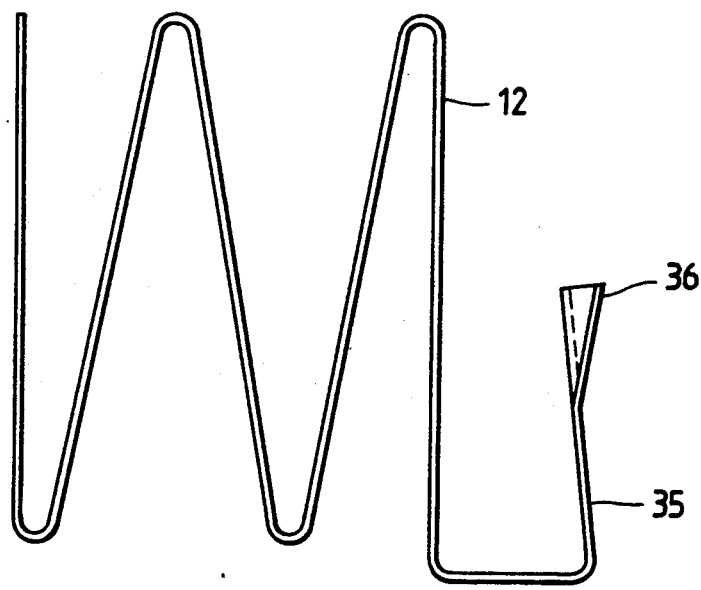
Figure 4C:
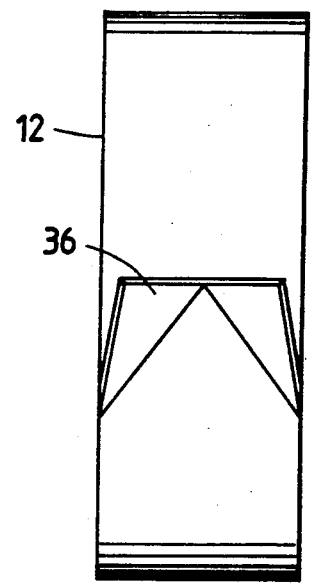

FIG. 2 shows the roller retaining cage 9 used in the embodiment of FIG. 1. FIG. 2A is a partly broken-away side view of the cage as seen from the left thereof. FIG. 2C is a side view of the cage as seen from the right thereof, and FIG. 2B is a cross-sectional view taken along the line A-O-A of FIG. 2C. The cage 9 is a molded flexible unitary article having, and comprises two circular ring portions 9A and 9B and a plurality of connecting portions E connecting these two circular ring portions together. The circular ring portion 9A has an outer diameter larger than the outer diameter of the circular ring portion 9B, and is adapted to be engaged with the outer race of the one-way clutch. Each connecting portion E comprises two circumferentially spaced apart portions, i.e., a roller supporting portion 15 and a spring supporting portion 16. Each roller 10 is pressed against the back of a roller supporting portion 15 by the biasing force of a corresponding accordion spring 12 mounted on a spring supporting portion 16. It is desirable that portion of the back of the roller supporting portion 15 against which the roller 10 bears be suitably formed into an arcuate shape in accordance with the outer diameter of the roller to enhance the roller supporting property and prevent the roller from dislodging during assemblage. The accordion spring, as shown in FIG. 4, is in the form of a bent metallic plate. FIG. 4A is a front view, FIG. 4B is a top plan view, and FIG. 4C is a right side view. The tip end 36 of a hanger portion 35 of the spring 12, as compared with the base portion thereof, is narrow in its opening width as shown so that the mountability thereof with respect to the spring supporting portion 16 of the cage may be improved. Further, the sides of the tip end 36 of the hanger portion 35 are bent substantially into a V-shape about the widthwise center thereof, as shown, to facilitate mounting of the spring. This V-shaped portion is readily formed during press shaping of the spring, so that no separate forming process is required to provide the V-shaped portion and production efficiency is maintained.

Each spring supporting portion 16 of the cage has a back portion with an inverted V-shape, and has an increased thickness in the vicinity of the center of the V-shape. The spring is easily mounted on the supporting portion 16 with the respective V-shaped portions thereof in engagement. In addition, when the spring 12 is mounted to the supporting portion 16, the center of the V-shaped portion of the spring is positioned more adjacent to the inner diameter than the center of the inverted V-shaped portion of the supporting portion 16, and this arrangement acts to keep the spring even more securely in place.

Near the circumferentially central portion of the inner periphery of each portion E, a groove 18 is formed parallel to the axis, and this groove 18 is closed on the circular ring 9A side and opens on the other circular ring 9B side. The inner diameter of the circular ring 9A is sufficiently small to act as a partition for grease on the left side of the circular ring 9A, and the groove 18 functions as a grease reservoir.

Figure 2G:
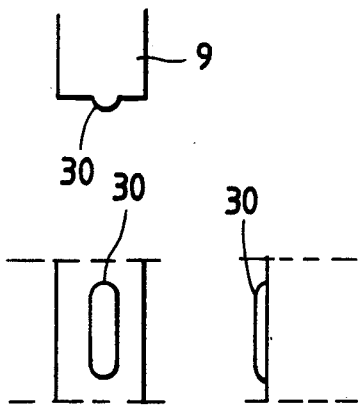
Figure 3A:
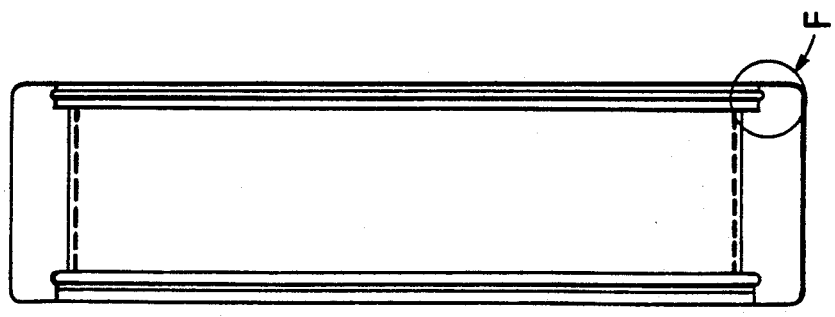
FIG. 3A is a front sectional view of an outer race.

In FIG. 1, a portion D is an engagement portion for preventing the separation of the outer race 8 of the one-way clutch from the cage 9. As shown in FIG. 2, projections 30 are formed on the outer peripheral portion of one circular ring 9A of the cage integrally with the cage. The projections 30, as shown in FIG. 2G, are elliptically convex portions slightly protruding from the cage 9. In the form shown FIG. 2, they are provided at two locations, but the number of them may be arbitrary. Each projection 30 is engaged with a receiving groove 31 in the end portion of the OWC designated as a portion F in FIGS. 3A and 3C. The cage 9 of OWC is incorporated into the outer race of the OWC after the accordion springs 12 are mounted therein and the rollers 10 are inserted. When the cage 9 is completely inserted into the outer race 8 of the OWC, the projections 30 fit into the grooves 31 shown in FIG. 3C and are fixed thereby. Thus, the cage, springs, and rollers are securely held within the outer race and the resulting subassembly of the OWC becomes very easy to handle for transport and in subsequent assembly steps.

Figure 5:
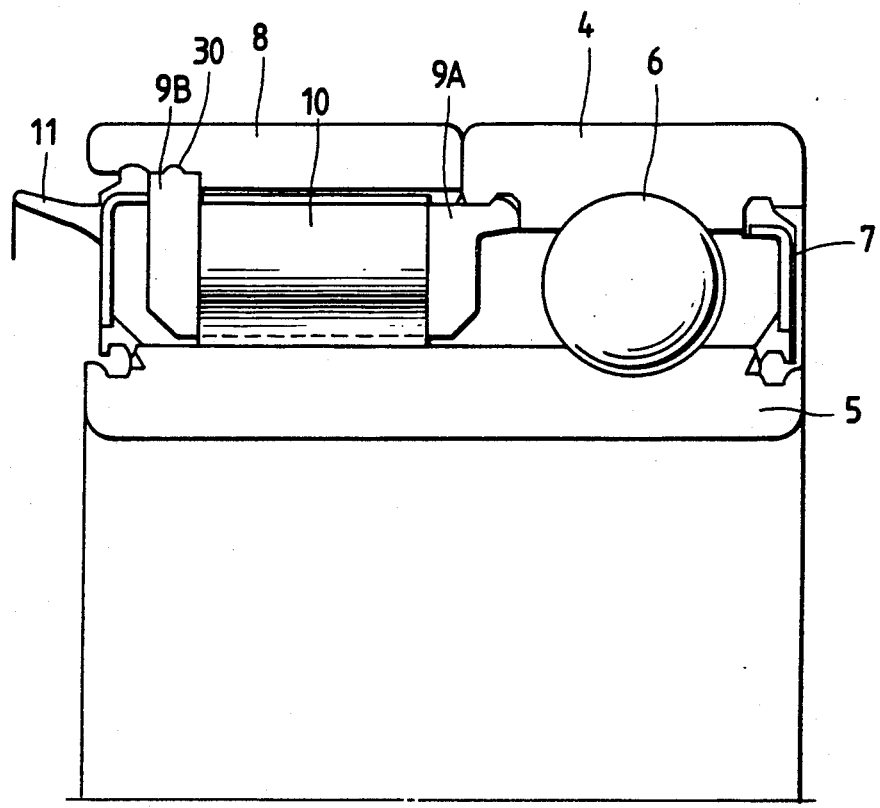
FIG. 5 shows another embodiment.

In the embodiment of FIG. 1, the coupling portion between the cage and the outer race of the OWC is provided on the circular ring 9A side of the bearing. FIG. 5 shows an embodiment in which the connecting portion is provided on the circular ring portion opposite to the bearing side, and in this case, the projections 30 are provided on the outer periphery of the circular ring portion 9B.

In FIG. 1, a portion B is the connecting portion between the one-way clutch portion 3 and the bearing portion 2. As shown in FIGS. 2B, 2C, 2E and 2F, the connecting portion on the OWC side is in the form of projections axially protruding from the circular ring portion 9A of the cage. In the form shown in FIG. 2, such projections are provided at two locations, but the number of them may be arbitrary. The tip end of each projection 32 is shaped for engagement with a groove 33 formed in the inner peripheral surface of the outer race of the bearing, as shown in FIG. 1A. The projections 32 are molded integrally with the cage made of a flexible material, and when the cage is joined to the bearing, the projections are initially caused to flex inwardly by the end surface of the bearing, and then they flex back outwardly to engage in the groove 33, thus completing fitting. A recess 35 may preferably be formed in the base of each projection 32 to facilitate the flexure of the projection 32. Also, as the fitting groove on the bearing side, use may be made of an ordinary seal groove formed in the inner peripheral surface of the outer race. When combining the one-way clutch portion assembly 3 with the bearing portion 2 as described above, the assembly 3 is inserted onto the inner race 5 of the bearing, and is pushed in axially until the projections 32 are positively engaged with the grooves 33 in the inner peripheral portion of the outer race of the bearing. Thereby the bearing portion 2 and the one-way clutch portion 3 are prevented from separating from each other after completion of the assembly. Therefore, the invention is compatible with robotic assembly techniques and the like. In the case of an alternative embodiment in which the outer race of the bearing is extended, the connecting projection for the cage and the OWC is provided on the inner peripheral surface of the cage and the receiving portion on the OWC side which is engaged with the projection 30 is provided in the outer peripheral surface of the inner race of OWC. Preferably in this case, the connecting projections 32 for the bearing portion and OWC may be provided near the inner peripheral surface of the cage and the grooves on the bearing side which are engaged by the projections 32 may be provided in the outer periphery of the inner race of the bearing.

Figure 6:
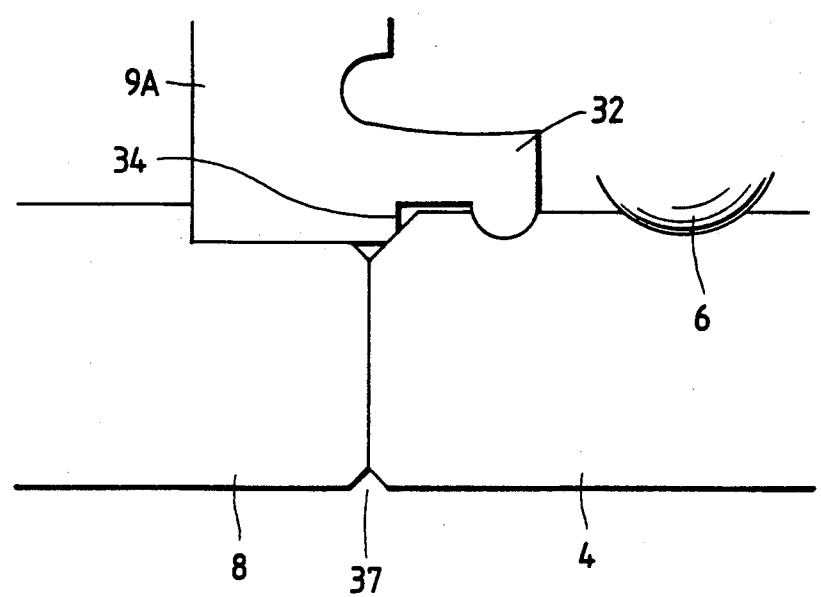
FIG. 6 is an enlarged view of the connecting portion between a bearing portion and a one-way clutch portion.

FIG. 6 is an enlarged view of the region containing the portion C in FIG. 1A, showing the outer race 4 of the bearing, the outer race 8 of the OWC and the circular ring portion 9A of the OWC. The end surface 34 of the cage 9 which is adjacent to the bearing side slightly protrudes from the end surface of the outer race of the OWC toward the bearing side and is adapted to contact with a chamfered portion of the inner periphery of the outer race of the bearing, as shown.

Thus, a sealing effect can be provided against the entry of contaminants along the portion of contact 37 between the outer race 4 of the bearing and the outer race 8 of the OWC. When the bearing and clutch are assembled, the portion 34 is only in light contact with outer race 4. However, during the actual use, the housing is forced in on the outer peripheral side and the shaft is forced in on the inner peripheral side so that the corner of the retainer portion 34 is pressed strongly against the outer race 4, thereby deforming the corner in such a manner as to fit to the chamfered portion of the inner periphery of the outer race and enhancing the sealing effect.

As described above, in the one-way clutch of the so-called unitary bearing type of the present invention, two kinds of engagement members integrally protruding from the cage of the one-way clutch portion fit to the one-way clutch and the bearing, respectively. Therefore, during the subassembly of the one-way clutch portion and further, during the assembly thereof to the bearing and during the mounting of the unitary article after completed for use, there is no possibility of the components separating from one another as in the prior art. Thus, the invention provides a one-way clutch of the unitary bearing type which greatly facilitates assembly and transportation and which is also compatible with assembly techniques utilizing robots or the like.

What is claimed is:

1. A one-way clutch of the unitary bearing type, comprising a bearing portion having an outer race and an inner race with a portion axially extended relative to said outer race, and a one-way clutch portion fitted to said extended portion and using said extended portion as an inner race thereof, wherein said one-way clutch portion includes another outer race, a plurality of rollers as wedge elements disposed between said inner race of said one-way clutch portion and said another outer race and cooperable with a corresponding plurality of cam portions provided on an inner peripheral surface of said another outer race, a respective spring imparting a biasing force to and supporting each said roller, and a cage for retaining said rollers, and wherein said cage has two circular ring-like members axially spaced apart from each other by a predetermined distance, a plurality of connecting portions of equal number to said rollers and connecting said two circular ring-like members together, a plurality of convex portions protruding from the outer peripheral surface of one of said circular ring-like members and engaged in a groove provided in the inner periphery of said another outer race, and a plurality of projections protruding axially from said one of said circular ring-like members and having enlarged tip ends engaged in a groove provided in the inner peripheral surface of said outer race of said bearing portion.

2. A one-way clutch of the unitary bearing type according to claim 1, wherein said spring is an accordion spring, and each of said connecting portions comprises a spring mounting portion for mounting said accordion spring thereon and a roller supporting portion for retaining said rollers.

3. A one-way clutch of the unitary bearing type according to claim 2, wherein said accordion spring comprises a bent metallic plate, a portion of said accordion spring mounted on said spring mounting portion is narrower in width at a tip end portion thereof than at a base portion thereof, said tip end portion being bent into substantially a V-shape about the widthwise center thereof and engaged with a substantially inverted-V-shaped back portion of said spring mounting portion, with a center of the V-shaped tip end portion of said spring being disposed radially inwardly from a center of the V-shaped back portion of said spring mounting portion.

4. A cage for one-way clutch, comprising a unitary structure of flexible resin, said structure including two circular ring-like members axially spaced apart from each other and further including a plurality of connecting portions axially connecting said two circular ring-like members together and having a predetermined width in a circumferential direction, with the outer diameter of one of said two circular ring-like members being larger than that of the other circular ring-like member, portions of said cage between adjacent connecting portions opening radially, and one of said circular ring-like members having a plurality of radially protruding convex portions on an outer peripheral surface thereof and having near said outer peripheral surface thereof a plurality of axially protruding projections each having an enlarged tip end portion.

5. A cage for one-way clutch according to claim 4, wherein an inner peripheral portion of each said connecting portion has an axially extending oil groove of predetermined width and depth substantially centered relative to a circumferential width of said connecting portion, and said oil groove opens in one of the circular ring-like portions and is closed in the other circular ring-like portion.

6. A one-way clutch of the unitary bearing type, comprising a bearing portion having a first race and a concentric second race with a portion axially extended relative to said first race, and a one-way clutch portion joined to said bearing portion and having a first race axially juxtaposed to said first race of said bearing portion and a concentric second race provided by said extended portion of said second race of said bearing portion, said one-way clutch portion further having a plurality of wedge elements disposed between said first and second races thereof and a cage retaining said wedge elements, said cage including a pair of axially spaced circular ring-like members connected by a plurality of connecting portions between which said wedge elements are retained, one of said circular ring-like members having a plurality of protuberances formed on one of an inner peripheral surface and an outer peripheral surface thereof and engaged in groove means formed in an opposed peripheral surface of said first race of said one-way clutch portion, said one circular ring-like member also having a plurality of projections which are extended axially from near said one peripheral surface and which have portions engaged in groove means formed in an opposed peripheral surface of said first race of said bearing portion.

7. A one-way clutch according to claim 6, wherein said wedge elements are constituted by rollers, and each roller receives a biasing force from a spring mounted to a corresponding said connecting portion.

8. A one-way clutch according to claim 7, wherein each of said connecting portions comprises a spring mounting portion and a roller supporting portion, said spring is an accordion spring having a tip end portion bent into substantially a V-shape and engaged with a substantially inverted-V-shaped back portion of said spring mounting portion of said corresponding connecting portion, with a center of said V-shaped tip end portion of said spring being displaced in a radial direction from a center of the V-shaped back portion of said spring mounting portion.

* * * * *